June 24, 1930.  D. E. ROSS  1,767,188
STEERING GEAR
Filed July 1, 1926   3 Sheets-Sheet 1
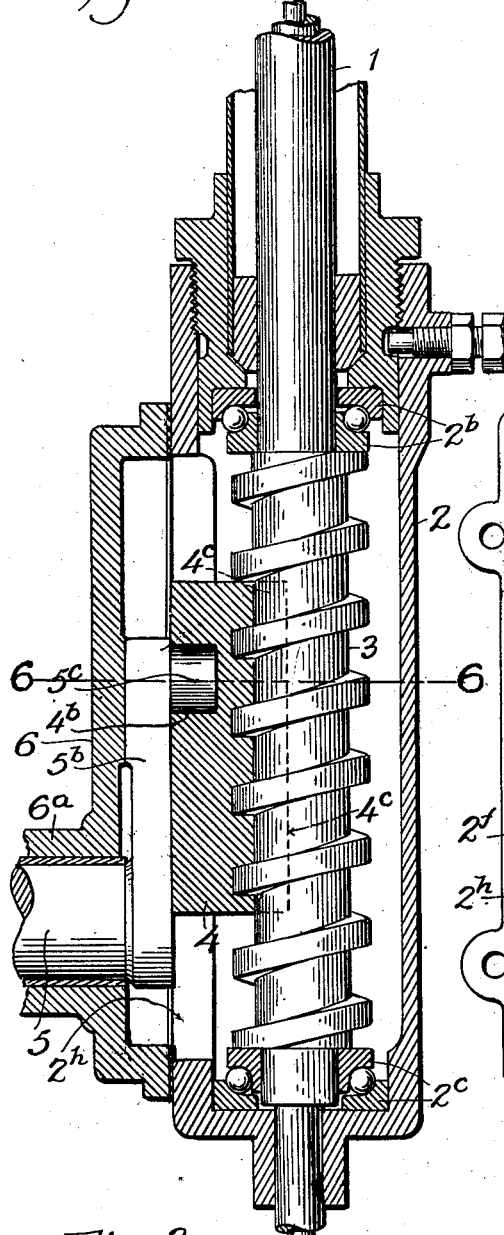
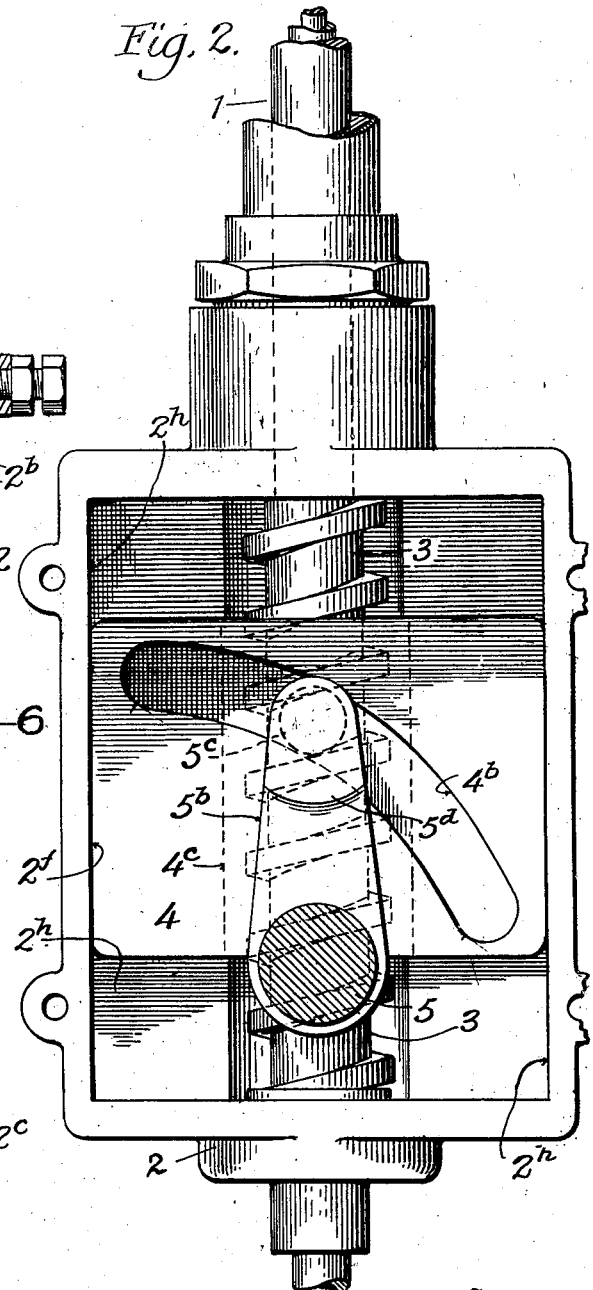
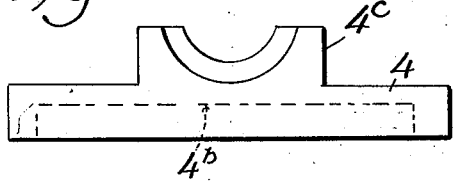
Inventor
David E. Ross
By Alexander & Powell
Attorneys June 24, 1930.     D. E. ROSS     1,767,188
STEERING GEAR
Filed July 1, 1926     3 Sheets-Sheet 2

Inventor
David E. Ross
By Alexander␣ Dowell
Attorneys

June 24, 1930.   D. E. ROSS   1,767,188
STEERING GEAR
Filed July 1, 1925   3 Sheets-Sheet 3

Inventor
David E. Ross.
By Alexander Powell
Attorneys

Patented June 24, 1930

1,767,188

UNITED STATES PATENT OFFICE

DAVID E. ROSS, OF LA FAYETTE, INDIANA, ASSIGNOR TO ROSS GEAR & TOOL COMPANY, OF LA FAYETTE, INDIANA, A CORPORATION OF INDIANA

STEERING GEAR

Application filed July 1, 1926. Serial No. 119,885.

This invention is a novel improvement in steering gears and the principal object thereof is to provide a simple, novel and efficient steering gear involving three working parts, namely, a screw, an actuating member comprising a slidable plate having a slot and nut, and a rocker shaft having a finger on its inner end provided with a pin engaging the slot in the actuating member.

Another object of the invention is to provide a steering gear which may be produced as a "stock" article in every particular except for the slot in the plate, and by properly designing the slot in the plate the steering gear may be made of any desired ratio, within reasonable limits, to produce a given extent of turning of the rocker shaft for a given extent of turning of the steering wheel. The gear may be used for either right or left hand drives, by simply reversing the plate, or the slot in the plate, and the slot may be generated to suit all the required positions of the steering wheel for a given position or extent of turn of the steering wheel.

Another object is to make a gear which will have an unusually long finger on the rocker shaft provided with a pin engaging the slot in the plate, thereby reducing to a minimum the unit pressure exerted on the pin, and hence reducing wear.

I will explain the invention with reference to the accompanying drawings, which illustrate one practical embodiment thereof, to enable others to adopt and use the same; and summarize in the claims the essentials of the invention and the novel features of construction and novel combinations of parts for which protection is desired.

In said drawings:—

Fig. 1 is a longitudinal section through a steering gear embodying the invention, in the plane of the steering shaft and rocker shaft, and showing the parts in normal midposition.

Fig. 2 is a rear view of Fig. 1 with the cover plate removed.

Fig. 3 is a top end view of the actuating member detached.

Figure 4:
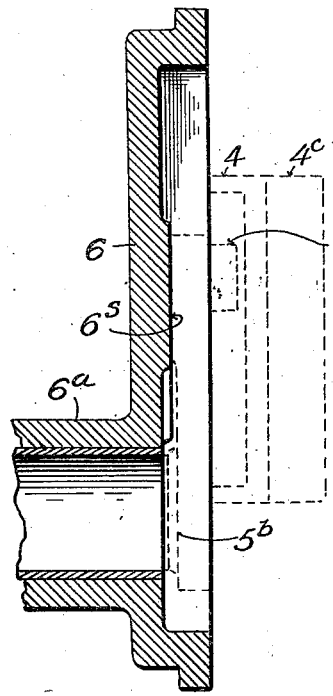
Fig. 4 is a vertical sectional view through the cover-plate detached.
Figure 5:
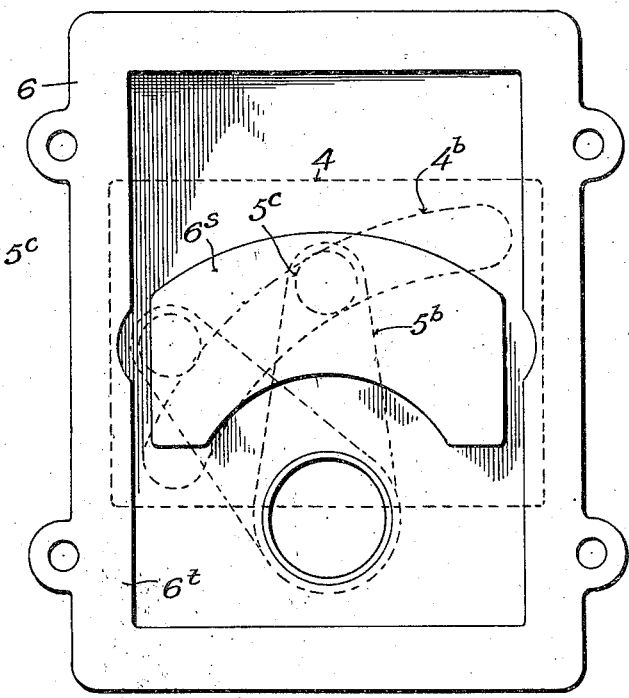
Fig. 5 is an inside face view of the cover plate.
Figure 6:
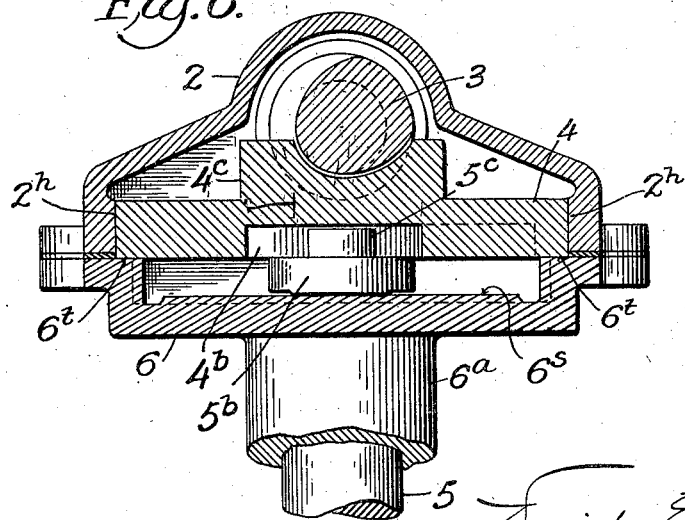
Fig. 6 is a transverse section of the gear on line 6—6 Fig. 1.

The steering shaft 1 may be any desired construction. As shown in Figs. 1 and 2 this shaft has its lower end journaled in ball bearings $2^b$ and $2^c$ in the upper and lower ends of the steer-gear casing 2. Fixedly secured to the shaft 1 within casing 2 is a worm or screw 3. This screw 3 may be formed integral with the shaft 1 if desired, or may be made separate therefrom and attached thereto in any desired manner. The screw 3 can be rotated in the casing 2 by turning shaft 1, but it has no longitudinal or lateral movement therein.

Slidably mounted in the casing 2 is an actuating member comprising a plate portion 4, and a nut portion $4^c$ formed with or rigidly connected to the plate portion 4. This actuating member is interposed between the screw 3 and the finger $5^b$ on the inner end of the rocker shaft 5, and the actuating member is slidably but non-rotatably mounted and guided in casing 2 and is adapted to be moved axially of the screw and perpendicularly of the rocker shaft 5. I have illustrated and described a half nut $4^c$ on the actuating member, engaging worm 3, as by use of such half nut the thickness of the casing 2 may be maintained at a minimum; but obviously a whole nut could be used if desired. The size of the actuating member is controlled by the size of the casing and the total extent of movement to be imparted to the actuating member by the screw 3.

In one side of the casing is an opening (as shown in Fig. 2) for the introduction of the actuating member, and the opposite side walls 2$^h$ of this opening form guides for the actuating member, which guides prevent tilting of the actuating member and binding of the nut 4$^c$ on the screw 3.

The actuating member is slidably confined in the casing by a removable cover plate 6 which is secured to the casing by bolts, not shown, or in any other suitable manner so as to close the opening therein. Cover plate 6 is preferably provided with a tubular extension 6$^a$, the axis of which is perpendicular to the shaft 1, and in this extension the rocker shaft 5 is mounted.

The rocker shaft 5 carries the usual steering arm (not shown) which is connected with the steering wheels of the vehicle in the usual manner. A crank or finger 5$^b$ is fixed on the inner end of the rocker shaft 5 within the casing; and is free to move between the actuating member and the cover plate 6.

The inner portions 6$^t$ of the side walls of the cover 6 which are adjacent guides 2$^h$ are adapted to also serve as guides for the actuating member 4 and will prevent the latter twisting or turning, and also prevent binding of the actuating member 4 between the guides 2$^h$ when the screw 3 is turned. The inner wall of the cover 6 is also provided with a bearing surface 6$^s$ which extends adjacent and opposite the path of movement of the finger 5$^b$ and will prevent the free end of the latter twisting, tilting or binding under pressure of the walls of the cam slot 4$^b$ against pin 5$^c$.

The plate portion 4 of the actuating member has a curved slot 4$^b$ in its rear face said slot extending diagonally of the plate and is adapted to be engaged by a pin 5$^c$ on the finger 5$^b$ of the rocker shaft.

Figure 7:
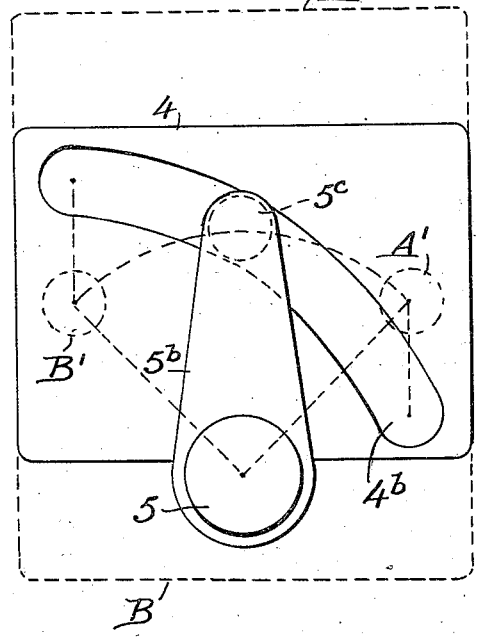
Fig. 7 is a diagram indicating in full lines the relative positions of the pin and actuating member for normal "straight ahead" driving; and in dotted lines the relative positions of the pin and actuating member at the extreme limits of movement of said member.

When the parts of the steering gear are in normal "straight ahead" driving position the finger 5$^b$ stands parallel with the screw 3 as shown in Figs. 1 and 2. While in this position pin 5$^c$ is not necessarily at the longitudinal center of the slot 4$^b$. When the steering shaft is turned the screw 3 will move the actuating member longitudinally of the screw 3 and the cam slot 4$^b$ will move pin 5$^c$ towards one or the other end of slot 4$^b$, thereby turning the rocker shaft and steering wheels right or left as desired. In order to adapt the steering gear to either right or left hand drives without reversing the threads of screw 3 it is only necessary to reverse the position of the slot 4$^b$ in the actuating member, f. i. Fig. 7 shows a right hand drive gear, and Fig. 8 a left hand drive gear, each having the same shaped slot in the actuating member, but the respective slots therein are in reversed positions.

Figure 8:
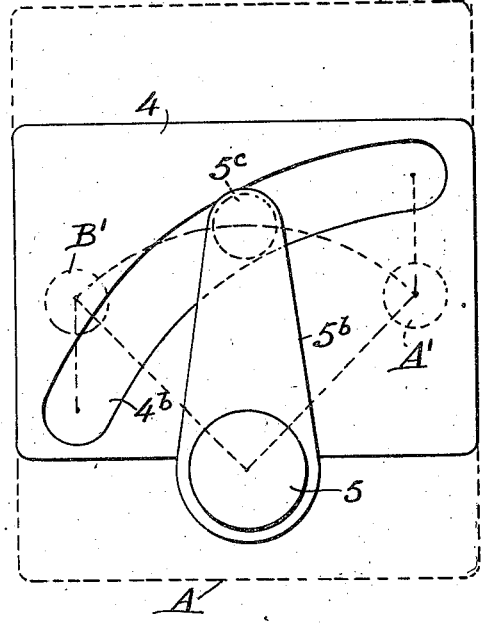
Fig. 8 is a similar diagram showing the slot reversed in the actuating member.

When the plate is moved to the position shown in dotted lines A in Figs. 7 and 8, the pin 5$^c$ will be moved to the right hand end of slot 4$^b$, as shown at A'. When the plate 4 is moved to the position shown by dotted lines B in Figs. 7 and 8, the pin 5$^c$ will be moved to the left hand end of slot 4$^b$ as shown at B'.

Figure 9:
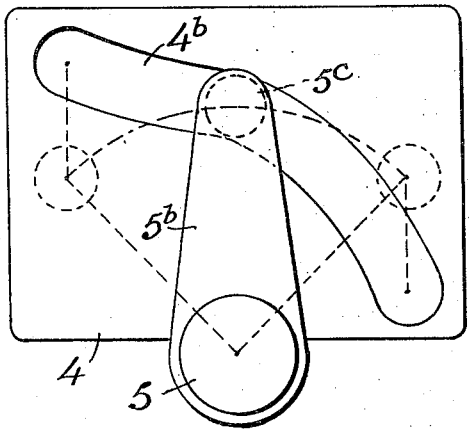
Figs. 9 and 10 are similar diagrams showing some of the many possible variations in the contour of the slot in the actuating member, whereby different gear ratios between turns of the steering wheel and the rocker shaft may be obtained.
Figure 10:
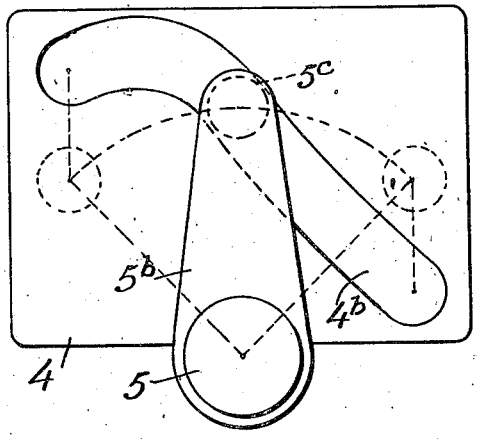

In both Figs. 7 and 8 the slot 4$^b$ is laid out mathematically for a gear ratio of 15:1—i. e. 15 degrees of movement of the actuating member 3 will impart one degree of movement to the rockershaft 5. In Fig. 9 the slot is plotted on a gear ratio of 18:1 at the extreme positions of pin 5$^c$, and a gear ratio of 14:1 in the normal "straight ahead" position of pin 5$^c$. In Fig. 10 the slot is plotted so that the ratio in the two extreme positions of the pin 5$^c$ will be 14:1, and in the normal "straight ahead" position of the pin 18:1. My invention, however, is not limited to any particular gear ratio or to any uniform gear ratio; and the slot 4$^b$ may be formed to give any desired gear ratio or movement within operative limits.

In plotting the slot 4$^b$ the central portion thereof or point at which the finger 5$^b$ stands in "straight ahead" or mid-position should have its walls sufficiently inclined to permit any actual dead center, or point at which the actuating member would become locked by the pin 5$^c$ against movement in the casing. In other words there should always be sufficient inclination or pitch of the walls of the cam slot at the center thereof to insure that the actuating member can be moved longitudinally and the pin 5$^c$ thereby started to right or left according to the direction of movement of the actuating member.

My novel steering gears can be made up in "stock" and completed in every particular except the slots 4$^b$ in the actuating members, which slots can be made of any desired contour to obtain any desired gear ratio within reasonable limits to suit any manufacturer or dealer. The same steering "stock" gear may also be readily adapted for both right and left hand drives by reversing the slots.

In this novel gear the finger 5$^b$ can be made longer than in the ordinary types of steering gears using crank fingers on the rocker shaft; and thus increased length reduces the pressure exerted on the pin 5$^c$ by the actuating member thereby lessening strains and wear on the gear.

The slots in the actuating member may be generated in accordance with the characteristics and ratios desired by any maker or dealer and the invention is not limited to the particular embodiment thereof shown in the drawings, as various changes could be made therein within the scope of the claims.

I claim:—

1. A steering gear comprising a casing; an actuating member slidably mounted in the casing having a diagonally disposed curved slot; a rocker shaft, means for moving the actuating member; a finger on the rocker shaft having a pin engaging the slot; the slot in the member varying in pitch from the center towards its ends; said casing having an opening for the admission of said actuating member; and a removable closure for said opening having a bearing for the rocker shaft.

2. A steering gear comprising a casing; an actuating member slidably mounted in the casing having a diagonally disposed slot; a rocker shaft, means for moving the actuating member; a finger on the rocker shaft having a pin engaging the slot; the slot in the member varying in pitch from the center towards its ends.

3. A steering gear comprising a casing; an actuating member slidably mounted in the casing having a diagonally disposed slot; a rocker shaft, means for moving the actuating member; a finger on the rocker shaft having a pin engaging the slot; said casing having an opening for the admission of said actuating member; and a removable closure for said opening having a bearing for the rocker shaft.

4. In a steering gear, a casing; a steering shaft extending into the casing; a rocker shaft extending into the casing at right angles to the steering shaft, the axis of the rocker shaft being perpendicular to the axis of the steering shaft; a finger on the rocker shaft; an actuating member slidably mounted in the casing between the steering shaft and the finger on the rocker shaft, said member having a diagonally disposed slot therein varying in pitch between its center and ends; and means for actuating said member by the steering shaft; said finger having a pin engaging the said slot.

5. In a steering gear, a casing; a steering shaft extending into the casing; a rocker shaft extending into the casing at right anles to the steering shaft; the axis of the rocker shaft being perpendicular to the axis of the steering shaft; a plate slidably mounted in the casing and having a diagonally disposed slot varying in pitch between its center and ends; a nut member rigid with the plate; a screw on the steering shaft engaging said nut member; and a finger on the rocker shaft having a pin engaging said slot.

6. In a steering gear, a casing; a steering shaft; a rocker shaft at right angles to the steering shaft; a plate slidably mounted in the casing between the steering shaft and the finger on the inner end of the rocker shaft, said plate having a slot therein extending diagonally of the axis of the steering shaft said slot varying in pitch between its center and ends; a half nut rigid with the plate; a screw on the steering shaft engaging said nut; and a finger on the rocker shaft having a pin engaging the slot.

7. In a steering gear, a casing; a steering shaft extending into the casing; a rocker shaft extending into the casing at right angles to the steering shaft, the axis of the rocker shaft intersecting the axis of the steering shaft; an actuating member slidably mounted in the casing between the steering shaft and the inner end of the rocker shaft, and having a slot extending diagonally of the axis of the steering shaft and varying in pitch between the center and each end; a finger on the rocker shaft having a pin engaging the slot; and a screw on the steering shaft in the casing engaging said actuating member.

8. In a steering gear, a casing; a steering shaft extending into the casing; a rocker shaft extending into the casing at right angles to the steering shaft; a plate slidably mounted in the casing between the steering shaft and the inner end of the rocker shaft, and adapted for movement longitudinally of the steering shaft and radially of the rocker shaft; said plate having a slot extending diagonally of the axis of the steering shaft said slot varying in pitch between its center and ends; a half nut rigidly connected with the plate; a screw on the steering shaft engaging said half nut; and a finger on the rocker shaft having a pin engaging the slot.

9. For a steering gear, an actuating member comprising a plate portion having a slot therein extending diagonally of the actuating member said slot varying in pitch between its center and ends; and a nut portion rigid with the plate portion.

10. For a steering gear, an actuating member comprising a plate portion having a slot therein extending diagonally of the actuating member adapted to be engaged by a pin on a finger on a rocker shaft; and a nut portion rigid with the plate portion, the slot in the plate portion varying in pitch between its center and each end to produce a varying ratio of movement of the rocker shaft.

11. In a steering gear, a casing; a steering shaft, a screw on the shaft within the casing; a rocker shaft extending into the casing, the axis of the rocker shaft being perpendicular to the axis of the screw; an actuating member slidably mounted in the casing between the screw and the end of the rocker shaft and adapted for movement longitudinally of the screw and radially of the rocker shaft; said actuating member comprising a threaded semi-cylindrical nut portion engaging the screw on the steering shaft and a plate portion having a slot extending diagonally of the axis of the worm; and a finger on the rocker shaft having a pin engaging the slot in the plate portion.

12. In a steering gear, a rocker shaft having a finger provided with a pin, and a slidable actuating member having a diagonally disposed slot varying in pitch between its center and ends and operatively engaged by the said pin to produce a varying ratio of movement of the rocker shaft by a uniform ratio of movement of the actuating member.

In testimony that I claim the foregoing as my own, I affix my signature.

DAVID E. ROSS.